United States Patent Office.

JOHN HOPKINSON, OF BRADFORD, ENGLAND.

PROCESS OF TREATING WOOL-GREASE.

SPECIFICATION forming part of Letters Patent No. 680,977, dated August 20, 1901.

Original application filed December 28, 1897, Serial No. 664,089. Divided and this application filed November 14, 1899. Serial No. 736,970. (No specimens.)

*To all whom it may concern:*

Be it known that I, JOHN HOPKINSON, a subject of the Queen of Great Britain, residing at Bradford, in the county of York, England, have invented certain new and useful Improvements in the Treatment of Wool-Grease and Soapsuds, of which the following is a specification.

This application is a division of my application filed in the United States Patent Office on the 28th of December, 1897, Serial No. 664,089.

This invention is applicable to the brown grease which is obtained from the washing or the back-washing of wool by treating the soapsuds with acid or to the grease obtained direct from wool by solvents or, in fact, to almost any other greases containing unsaponifiable matter.

Now by my invention I obtain the lanolin or the grease from which it is made in great purity. I obtain also an extremely viscous oil consisting entirely of neutral fat which is a remarkably good lubricant for heavy machinery, and I further obtain a very pure form of soap. I partially saponify the raw grease by adding to one hundred pounds of grease eighteen and one-half pounds of caustic-soda solution, specific gravity 1.250, or equivalent quantity of caustic potash of specific gravity about 1.250 and boil the mixture until the alkali is absorbed. The amount of alkali required for this purpose is preferably about fifty per cent. of that actually necessary to fully saponify the saponifiable fats in the grease. As this amount differs with different greases and with the wool-fat from different climates it is impossible to give exact quantities; but the quantity required to fully saponify it can be easily found by experiments or analysis of a small portion of each batch. The mixture is boiled until the alkali is absorbed. I add sufficient chlorid of sodium or other soda salt in solution as will precipitate the unsaponified fat. The exact amount of chlorid of sodium can only be found with each given variety of fat by experiment, but is approximately fourteen pounds of salt in solution to one hundred pounds of fat operated on. The mixture is allowed to repose for a few hours. The unsaponified fat rises and forms a superstratum of anhydrous lanolin. The substratum is a mixture of soap and fat alcohols in solution. The superstratum is removed and to the substratum is added ethyl or methyl alcohol or methylated spirit in the proportion of about three and a half times the original bulk of grease operated upon, the mythylated spirits being preferably of specific gravity .950. The object of adding ethyl or methyl alcohol is to obtain a complete separation of the constituents of wool-grease; but this can only be done in conjunction with saponification and the addition of benzol or other solvent, insoluble in alcohol. It is utterly impossible to completely separate neutral fat and soap by the application of alkalies in aqueous solution, either in a state of hydrate or carbonate, the fat from the apparently separated soap having about the same composition as the mixed fat which floats on the top. I now add a solvent of fat alcohols, preferably coal-tar benzol, which does not dissolve soap, but only dissolves the fat alcohols when the soap is dissolved in methylated spirits or ethyl alcohol of the strength and quantity named—namely, specific gravity .950 and three and one-half times the weight of the original grease. This coal-tar benzol is added a little at a time and thoroughly stirred up. The fat alcohols and benzol rise to the surface and are skimmed off and the solvent separated by distillation. The fat alcohols thus obtained are an excellent lubricant. The soap solution is finished in the usual well-known way of soap-boilers and is then ready for either household or manufacturing purposes.

Where it is not requisite to obtain the lanolin and fatty alcohols in separate form, the process can be simplified by completely saponifying at start—say by adding about thirty pounds of solution of caustic soda, specific gravity 1.250, or an equivalent amount of caustic potash to one hundred of grease; but the exact amount is ascertained by an analysis of each batch. The ethyl or methyl alcohol or methylated spirits is added and the mixture is submitted to a pressure of two atmospheres until saponification is complete. After cooling down to about 180° Fahrenheit the coal-tar benzol is added, as before. This dissolves the lower fat alcohols, cholesterin, and isocholesterin, leaving the soap, however, with the mythlated spirits as a lower stratum. After standing for a time the upper layer is drawn or skimmed off, and, if necessary, further, benzol added to the lower layer and again skimmed off till all the unsaponifiable matter is withdrawn from the soap. Each of the two liquors is distilled to separate the solvent, as before. The upper layer produces a mixture of fatty alcohols, cholesterin, and isocholesterin, forming an admirable lubricant of extraordinary viscosity and the lower layer a capital soap for household or manufacturing purposes.

It is obvious that if the entire process first described were carried out and the raw lanolin and the fatty alcohols added together instead of being kept separate the results and the chemistry of the two processes would be identical.

What I claim is—

1. The process of treating wool-grease and other like greases containing unsaponifiable matter, which consists in subjecting the grease to the action of caustic-alkali solution, thereby partially saponifying, adding salt, skimming off the raw lanolin, adding ethyl or methyl alcohol and a solvent of fat alcohols insoluble in aqueous solution of ethyl or methyl alcohol, allowing the mixture to subside into two layers and distilling each layer separately whereby the solvents are distilled off and fat alcohols are obtained from the one and soap-stuff from the other, which latter can be finished into a valuable soap in the ordinary manner.

2. The process of treating wool-grease and other like greases containing unsaponifiable matter, which consists in subjecting the grease to the action of caustic alkali, ethyl or methyl alcohol, and a solvent of fat alcohols insoluble in alcohol, and allowing the mixture to separate into two layers, distilling off the solvents from each layer whereby a mixture of raw lanolin and fat alcohols admirable as a lubricant is obtained in one case and a soap-stuff in the other.

3. The process of treating wool-grease and other like greases containing unsaponifiable matter, which consists in partially saponifying with caustic alkali and heat, adding spirits and coal-tar benzol whereby it is divided into two layers on standing, separating these two layers and distilling off the solvents, whereby the fatty alcohols and a good soap-stuff are separately obtained.

In witness whereof I have hereunto signed my name, this 13th day of September, 1899, in the presence of two subscribing witnesses.

JOHN HOPKINSON.

Witnesses:
DAN COATES,
GEORGE W. BLIGH.